US009038811B2

(12) United States Patent
Nilsson et al.

(10) Patent No.: US 9,038,811 B2
(45) Date of Patent: May 26, 2015

(54) ARRANGEMENT OF TIGHT-FITTING SCREW CONVEYORS

(71) Applicant: VEMAG Maschinenbau GmbH, Verden/Aller (DE)

(72) Inventors: Kersten Nilsson, Verden (DE); Gert Bär, Dresden (DE)

(73) Assignee: VEMAG Maschinenbau GmbH, Verden/Aller (DE)

( * ) Notice: Subject to any disclaimer, the term of this patent is extended or adjusted under 35 U.S.C. 154(b) by 0 days.

(21) Appl. No.: 14/189,314

(22) Filed: Feb. 25, 2014

(65) Prior Publication Data
US 2014/0238824 A1    Aug. 28, 2014

(30) Foreign Application Priority Data

Feb. 26, 2013    (DE) .................. 20 2013 001 817 U

(51) Int. Cl.
| B65G 33/18 | (2006.01) |
| B65G 33/06 | (2006.01) |
| A22C 11/08 | (2006.01) |
| A21C 1/06  | (2006.01) |
| B01F 7/00  | (2006.01) |
| B01F 7/08  | (2006.01) |

(52) U.S. Cl.
CPC .............. *B65G 33/18* (2013.01); *A22C 11/08* (2013.01); *B65G 33/06* (2013.01); *A21C 1/065* (2013.01); *B01F 7/00416* (2013.01); *B01F 7/082* (2013.01); *B01F 7/085* (2013.01)

(58) Field of Classification Search
CPC ......... B65G 33/06; B65G 33/18; A22C 11/08

USPC .............. 198/663, 669, 562, 548; 452/44; 366/339, 85
See application file for complete search history.

(56) References Cited

U.S. PATENT DOCUMENTS

| 2,693,348 | A | * | 11/1954 | Ellermann ..................... 366/85 |
| 2,889,574 | A | * | 6/1959 | Thielen et al. .................. 452/43 |
| 3,170,566 | A |   | 2/1965 | Zimmermann |
| 3,254,367 | A |   | 6/1966 | Erdmenger |
| 3,255,814 | A |   | 6/1966 | Zimmermann |
| 3,392,831 | A | * | 7/1968 | Eckhardt ....................... 209/571 |
| 3,506,066 | A |   | 4/1970 | Nonnenmacher |

(Continued)

FOREIGN PATENT DOCUMENTS

| DE | 349523 C | 3/1922 |
| DE | 652990 C | 11/1937 |

(Continued)

*Primary Examiner* — Mark A Deuble
(74) *Attorney, Agent, or Firm* — Wood, Herron & Evans, LLP

(57) ABSTRACT

An arrangement including two conveyor screws which are arranged rotatably moveably relative to each other for processing a pasty material like a foodstuff product or the like, having a first conveyor screw and a second conveyor screw which have interengaging helical flights and which in particular are drivable in opposite relationship. The conveyor screws are of different size diameters and/or the conveyor screws have a different number of flights. In addition, the surfaces of the interengaging flights are so shaped and matched to each other that they are in contact with each other along a substantially continuous contact line extending substantially in the longitudinal direction of both conveyor screws to hinder, preferably prevent a return flow of the pasty material.

16 Claims, 3 Drawing Sheets

(56) References Cited

U.S. PATENT DOCUMENTS

| | | | |
|---|---|---|---|
| 3,929,323 A | 12/1975 | Smith | |
| 4,474,475 A * | 10/1984 | Moriyama | 366/85 |
| 4,484,606 A * | 11/1984 | Kosters | 141/114 |
| 4,858,487 A | 8/1989 | Mercier | |
| 4,944,657 A * | 7/1990 | Mowli | 417/203 |
| 5,120,208 A | 6/1992 | Toyoshima et al. | |
| 6,447,156 B2 * | 9/2002 | Maris | 366/82 |
| 6,783,270 B1 * | 8/2004 | Padmanabhan | 366/82 |
| 7,017,732 B2 * | 3/2006 | Uphus | 198/663 |
| 7,044,289 B2 * | 5/2006 | Madsen et al. | 198/663 |
| 7,097,442 B2 * | 8/2006 | Sawa | 425/204 |
| 2003/0112698 A1 * | 6/2003 | Hauck et al. | 366/85 |
| 2003/0206482 A1 * | 11/2003 | Griggs | 366/81 |

FOREIGN PATENT DOCUMENTS

| | | |
|---|---|---|
| DE | 1180718 B | 11/1964 |
| DE | 1191765 B | 4/1965 |
| DE | 1553134 A1 | 9/1970 |
| DE | 2119604 A1 | 6/1973 |
| DE | 19830242 A1 | 9/1999 |

* cited by examiner

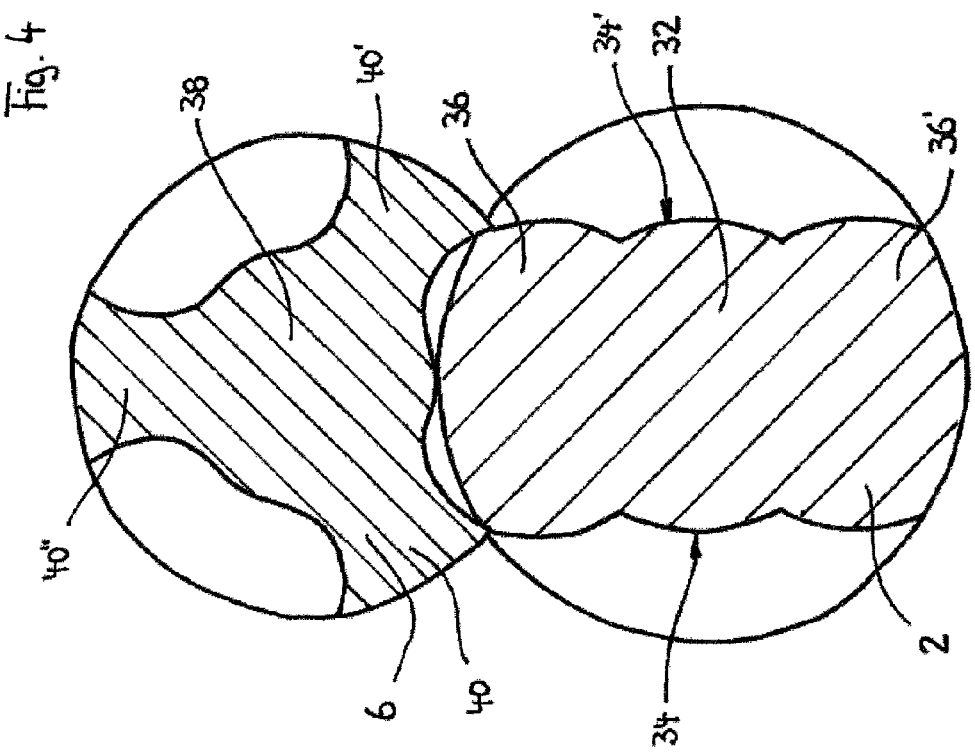
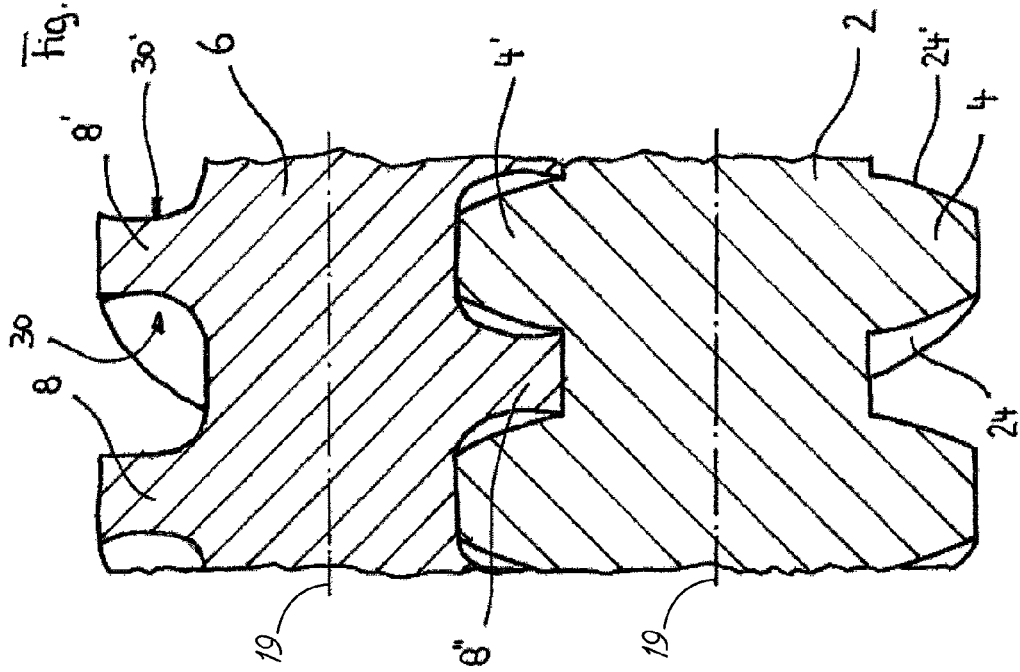

ARRANGEMENT OF TIGHT-FITTING SCREW CONVEYORS

BACKGROUND

The invention concerns an arrangement including two conveyor screws which are arranged rotatably moveably relative to each other for processing a pasty material like a foodstuff product or the like, and in particular an arrangement having a first conveyor screw and a second conveyor screw which have interengaging helical flights and which, in particular, are drivable in opposite relationship.

Arrangements are known which are used, for example, for the automated processing of pasty materials like dough items, sausage meat, or the like. In that case, the pasty material, also referred to as the foodstuff product, is frequently mixed during the processing operation by known conveyor screw arrangements, and at the same time is moved in a predetermined conveying direction and possibly also divided up into portions. For that purpose, two conveyor screws, also referred to as conveyor curves, are arranged rotatably relative to each other with their in particular helical flights, in which case the material or the product is generally moved in the longitudinal direction of the conveyor screws with the mutually interengaging flights. Such arrangements of conveyor screws are usually a component part of apparatuses for processing dough and sausage materials, wherein the apparatuses in turn, for example, are used within a vacuum filling machine. A finished end product is produced from the material with such filling machines.

In the past, arrangements of conveyor screws were used that involved various profile shapes, also known as C-, D- or N-profiles, or also combinations of the above-mentioned profile shapes. The known profile shapes, however, suffer from the disadvantage that there are, in part, relatively large gaps between the interengaging flights of the two conveyor screws so that the filling spaces of the conveyor screws between the flights are only inadequately sealed off. The consequence of this is that, especially when high pressures are involved during the processing operation, at least a part of the material to be conveyed through the arrangement flows back in opposite relationship to the actual conveying direction of the conveyor screws. On the one hand, this gives rise to a loss of efficiency; while on the other hand, the partial return flow has a detrimental effect on both the appearance of the finished product and also on the portioning accuracy of a filling machine equipped with such an arrangement.

SUMMARY

An object of the embodiments of the invention is thus to provide an arrangement of conveyor screws which overcome disadvantages from the state of the art and with which in particular improved economy is achieved.

In an arrangement including two conveyor screws which are arranged rotatably moveably relative to each other of the above-indicated kind, the conveyor screws may be of different size diameters and/or the conveyor screws may have a different number of flights, and the surfaces of the interengaging flights are so shaped and matched to each other that they are in contact with each other along a substantially continuous contact line extending substantially in the longitudinal direction of both conveyor screws to hinder, preferably prevent, a return flow of the pasty material.

The embodiments of the invention are based on the realization that interengaging conveyor screws with conveyor screw profiles which sealingly close with each other are afforded by conveyor screws which are of diameters of different sizes and/or which have a different number of flights. The sealingly closing conveyor screw profiles ensure almost complete sealing of the filling spaces between the flights of the mutually adjacent conveyor screws. In addition, the preferably continuous or constant contact line or small gap dimensions between the conveyor screws which are arranged rotatably moveably relative to each other, also referred to as conveyor curves, in the case of conveyor screws which are preferably drivable in opposite directions or in opposite relationship, hinder or prevent a return flow of the foodstuff material being conveyed in opposite relationship to the conveying direction, particularly when there are high pressures in the conveyor path. The substantially continuous contact line extending substantially in the longitudinal direction between the conveyor screws permits uniform conveying, mixing, and possibly also portioning of the pasty material like, for example, dough or sausage meat, whereby the economy of the filling machine is substantially improved. In addition, the portioning accuracy of the pasty foodstuff material is increased subsequently to a conveyor path afforded by the conveyor screws, for example, in the filling operation. Preferably, the first and second conveyor screws of the arrangement are of diameters of differing sizes and at the same time the first and second conveyor screws have a different number of flights, thereby giving a corresponding number of spiral passages by which the foodstuff material is moved along the conveyor screw. The term spiral passages is used to denote the respective passages or gaps extending along the conveyor screw between the helical flights. The expression drivable in opposite directions or in opposite relationship is used to denote movement of the first and second conveyor screws in opposite directions of rotation.

By virtue of the substantially continuous contact line between the two conveyor screws with each other, gaps between the conveyor screw surfaces which roll against each other are entirely or substantially avoided. In practice, however, very small gaps can exist between the surfaces of the conveyor screws which roll against each other. In spite of the small gap dimensions which sometimes occur, it is possible to counteract a return flow of the product or material to be conveyed, even at high pressures in the conveyor path, during processing of the foodstuff material. The continuous sealing action between the conveyor screws also has an advantageous effect on the appearance of the product to be produced by a filling machine which preferably has the arrangement according to the embodiments of the invention. By virtue of the manufacturing deviations which in practice are almost inevitable at the conveyor screws or conveyor curves, the conveyor screws are manufactured with tolerances which are so matched to each other that preferably an oversize in the region of the contact surfaces between the conveyor screws can be avoided and, thus, it is possible to exclude the surfaces rubbing against each other. In the best-case scenario, the conveyor screws are produced of such a size that there is no gap between them and, thus, the theoretically complete sealing effect between the conveyor screws, also referred to as conveyor curves, is guaranteed. For example, between the surfaces of the first and second conveyor screws, there is a small gap of a few tenths or hundredths of a millimeter, which is sufficiently small to hinder or prevent a return flow.

In accordance with an embodiment of the invention, it is provided that the first conveyor screw preferably has two flights and the second conveyor screw preferably has three flights. With the use of a first conveyor screw, also referred to as the main conveyor screw, having two flights and a second conveyor screw, also referred to as the subsidiary conveyor screw, having three flights or three spiral passages provided between the flights, it is firstly possible for the conveyor screw profiles to be individually adapted to each other. By virtue of the profiles preferably being exactly matched to each other, between the conveyor screws which preferably extend in mutually parallel relationship, it is then possible to guarantee substantially complete sealing. Preferably, the conveyor screws with their interengaging helical flights involve a difference of at least one flight or spiral passage relative to each other. In other embodiments, the first conveyor screw can also have three, four, or five flights. In that case, the second conveyor screw which is in contact with the first conveyor screw preferably has at least one spiral passage or flight more than the first conveyor screw. The second conveyor screw then correspondingly includes four, five, or six flights. By virtue of the differing number of flights on the conveyor screws, the first conveyor screw and the second conveyor screw are preferably driven at different speeds of rotation.

Preferably, the second conveyor screw is of a smaller outside diameter in comparison with the first conveyor screw, thereby advantageously achieving a compensation effect in regard to the differing number of flights and the resulting different kinds of cross-sectional profiles on the conveyor screws. A preferred combination of the different number of flights on the two conveyor screws and the differing outside diameters of the first and second conveyor screws can ensure at any moment in the relative movement of the conveyor screws which are rotated in mutually opposite relationship, relative to each other, a contact line which extends in the longitudinal direction of the conveyor screws and which preferably provides a sealing closing effect substantially between the surfaces of the conveyor screws.

Preferably, the contact line extends substantially in the longitudinal direction of both conveyor screws. The contact line between the conveyor screws, which preferably extends substantially in the longitudinal direction, provides for a constant contact between the surfaces of the conveyor screws or conveyor curves, that roll or slide against each other, and thus ensures an advantageously reliable conveying movement in respect of the product which in that case is possibly to be mixed and which is to be divided into portions at the end of the conveying movement. The term contact line extending substantially in the longitudinal direction also means a contact line which in particular has shorter portions which, in relation to the longitudinal axes of the conveyor screws, preferably also extend in for example a radial or tangential direction.

According to another embodiment of the invention, it is provided that the surfaces of the flights are in contact with each other along the continuous contact line preferably substantially in areal relationship or with common tangential planes. The flights of the first and second conveyor screws are so shaped or matched to each other that there is rather a surface contact between the surfaces of the first and second conveyor screws, which is a preferred embodiment of the arrangement and in that way practical sealing of the filling spaces relative to each other is implemented. That avoids an "edge-wise" contact which is interrupted in portion-wise fashion and which occurs with the C-, D- and N-profiles of two conveyor screws. In the case of a flank clearance between the surfaces of the two conveyor screws, the common tangential plane at each contact point of the theoretical contact line is then broken down into two tangential planes which extend parallel at a spacing relative to each other and relative to same. One of the tangential planes is on the first conveyor screw and the other on the second conveyor screw.

Preferably, the contact line is composed of a plurality of line portions arranged in a row with each other, wherein the line portions extend relative to the axes of rotation of the conveyor screws alternately at least approximately in an axial direction and substantially in a radial direction. The preferred subdivision of the contact line into a plurality of line portions arranged in succession provides that the contact line advantageously extends along the conveyor screws, having a plurality of different surface portions, in the longitudinal direction. The line portions extending in the axial direction are oriented parallel to the axes of rotation of the conveyor screws. The line portions which extend substantially in the radial direction are preferably each in an orientation relative to the axes of rotation of the conveyor screws, which involves a principally radial component and also an axial component. The ratio between the axial component and the radial component is in a region of preferably 1:3.

Preferably, the axially-extending line portions of the contact line lie on a connecting plane defined by both axes of rotation of the conveyor screws. That provides a structurally simple optional way of providing the sealing effect between, in particular, the outer peripheral surfaces of the flights of the two conveyor screws which are oriented in axis-parallel or non-axis-parallel relationship with each other, with a respectively associated bottom between the flights of the respectively adjacent conveyor screws. The peripheral surfaces of the flights are, at the same time, the peripheral surfaces of a respective conveyor screw.

Preferably, on each conveyor screw, the axially-extending line portions are respectively adapted to extend over surface regions of the outer peripheral surface of the flights and a bottom between the flights of a conveyor screw. With the surface portions of the flights that extend in axis-parallel relationship, it is possible to implement an advantageous sealing effect with the surface regions, which are respectively directly in contact and which are also oriented in axis-parallel relationship, of a bottom of the conveyor screws which are arranged rotatably moveably relative to each other. Specifically, the outer peripheral surfaces of the flights of both conveyor screws come into advantageously sealing and ongoing contact in the connecting plane between the conveyor screws with a respective bottom between the flights.

In a preferred embodiment of the invention, it is provided that the substantially radially-oriented line portions of the contact line are adapted to extend alternately displaced relative to both sides of the axially-extending line portions in such a way that the radially-oriented line portions include an acute angle relative to each other with respect to the axis of rotation of a conveyor screw. With the alternately displaced configuration or orientation of the radially-oriented line portions relative to the axial line portions and therewith relative to the connecting plane extending through the axial line portions, this provides a structurally advantageous possible way of producing a continuous or constant contact line between the conveyor screws and at the same time ensuring optimum freedom of mobility of the two conveyor screws without high frictional losses relative to each other. The displacement between the radially-extending line portions which are oriented at a spacing relative to each other is preferably in an annular range of less than 90 degrees.

The line portions oriented substantially in the radial direction extend over a surface region approximately transversely relative to the direction in which the flight flank extends, which each laterally delimit the respective flights on one of their sides. Therefore, the radially-oriented line portions preferably extend over the shortest path from the one edge of the flight flank to the opposite side. In that arrangement, the radially-extending line portions which extend over the flight flanks facing in the conveying direction are respectively arranged on or along a side of the connecting plane. In contrast, the radially-oriented line portions which extend over the flight flanks remote from the conveying direction are arranged along the opposite side of the connecting plane. This therefore gives a continuously repeating arrangement of the radially-oriented line portions at both sides of the connecting plane.

The axially-extending line portions and the substantially radially-oriented line portions which are respectively provided in displaced relationship with the axially-extending line portions are preferably connected to each other by way of approximately tangentially-extending line portions. Tangentially-extending line portions permit an advantageously simple connection between the axially-extending line portions and the radially-oriented line portions in order to provide the continuous contact line.

According to an embodiment of the invention, the tangentially-extending line portions extend region-wise at least parallel along a flight outside edge which subdivides the outer peripheral surface of the flight from the flight flank and along a flank inside edge which delimits the bottom between the flight or flights from the flight flank. The configuration of the tangentially-extending line portions along an outside and/or inside flight edge represents an advantageously simple possible way of implementing the necessary connection between the axially and radially-oriented line portions. An unnecessarily complicated and expensive configuration in respect of the tangentially-extending line portions connecting the axially- and radially-oriented line portions is avoided with the configuration along the inside and outside flight edges. In that way, it is possible to produce the contact line in an advantageously simplified manner on two interengaging conveyor screws. An advantageously sealing contact is preferably ensured between the outside edges of a flight of the first conveyor screw or conveyor curve and the flight inside edges corresponding thereto in the region of a bottom between two flights of the second conveyor screw or conveyor curve. Besides the pure tangential motion component, each approximately tangentially-extending line portion has a negligible axial component in its configuration by virtue of the pitch of each helically-extending flight.

It is further provided that a helical flight of a first conveyor screw has flight flanks with a convex curvature with respect to a longitudinal section through the conveyor screw. The convex curvature of the flight flanks makes it possible to achieve a preferably sealing contact with the corresponding flight flank of the adjacently arranged conveyor screw. In that case, the radius of curvature is so selected that a radially-oriented line portion of the contact line extending approximately in the longitudinal direction of the conveyor screws, with respect to a connecting plane extending through the axes of rotation of the conveyor screws which are arranged rotatably relative to each other, is respectively arranged or oriented alternately in displaced relationship towards the right and the left in relation to the defining connecting plane. The first conveyor screw is, in particular, the main conveyor screw of the arrangement.

In accordance with another embodiment of the invention, there is provided a helical flight on the second conveyor screw, which in longitudinal section along the connecting plane extending in the longitudinal direction, has flight flanks with a concave curvature. The concave flight flanks involve a radius of curvature which is preferably adapted to the corresponding convex flight flanks of the first conveyor screw. Thus, formed between both conveyor screws is a contact line having line portions, which extends substantially in the longitudinal direction between the conveyor screws. The second conveyor screw is preferably the subsidiary conveyor screw of the arrangement that is in engagement with the main conveyor screw.

A further embodiment of the invention concerns an apparatus for processing a foodstuff, in particular for producing a string of a pasty material, comprising an inlet, an outlet, and a conveyor path extending between the inlet and the outlet, and a conveyor device which is arranged in the conveyor path and which is adapted to convey the foodstuff from the inlet in the direction of the outlet. In that respect, the conveyor device has an arrangement of conveyor screws as set forth herein.

On an apparatus for processing foodstuffs that is equipped with an arrangement comprising two conveyor screws or conveyor curves, advantageously simplified processing of the foodstuff is now achieved within the apparatus by virtue of the contact line between the conveyor screws, that is a continuous line. During the conveying movement of the foodstuff which is preferably in the form of a pasty material through the apparatus, in which case besides being conveyed with the conveyor screws the material is preferably also mixed at the same time and finally divided into portions, a return flow of the material moved in the conveying direction is advantageously prevented. In that way, the procedure involved in processing the foodstuff which, for example, is in the form of dough or sausage material can advantageously be improved. In addition, because a return flow in respect of the incoming flow of the material to be conveyed in opposite relationship to the actual conveying direction is counteracted, the degree of portioning accuracy of the apparatus equipped with the arrangement for processing the pasty material is also advantageously improved. With the arrangement of conveyor screws, the apparatus in an embodiment has conveyor screws with a uniform pitch. In a further embodiment, the conveyor screws are equipped along their conveyor screw portion with at least two different pitches. In addition, the apparatus has a housing which surrounds the conveyor screws or conveyor curves and which has an inlet and an outlet.

According to a further embodiment of the invention, a filling machine is provided for producing sausages from a pasty material like sausage meat or the like. The filling machine, preferably a vacuum filling machine, is equipped with a filling hopper for receiving the pasty material, and an apparatus for processing a foodstuff as set forth above. In addition, the filling machine is equipped with an extrusion head for producing a string of the pasty material and has at least one dividing device for dividing the shaped string covered with a casing material into individual portions, with the formation of a division location. The use of the apparatus for processing a foodstuff having its conveyor screws which involve a constant contact line relative to each other makes it possible to advantageously improve the degree of efficiency of the vacuum filling machine which is preferably used. The conveyor screws which are preferably used on the apparatus for processing foodstuffs like, for example, a dough material or a sausage material preferably have axes of rotation which are oriented in parallel relationship. In an embodiment, the conveyor screws have axes of rotation which are inclined relative to each other so that the conveyor screws then have a periphery which decreases or narrows in one of the longitudinal directions.

BRIEF DESCRIPTION OF THE SEVERAL VIEWS OF THE DRAWINGS

The invention is described in greater detail hereinafter by means of the preferred embodiment and with reference to the accompanying Figures in which:

FIG. 3 shows a view in longitudinal section of an arrangement according to an embodiment of two conveyor screws, and FIG. 4 shows a view in cross-section of the arrangement according to the embodiment as shown in FIG. 2.

DETAILED DESCRIPTION

Figure 1:
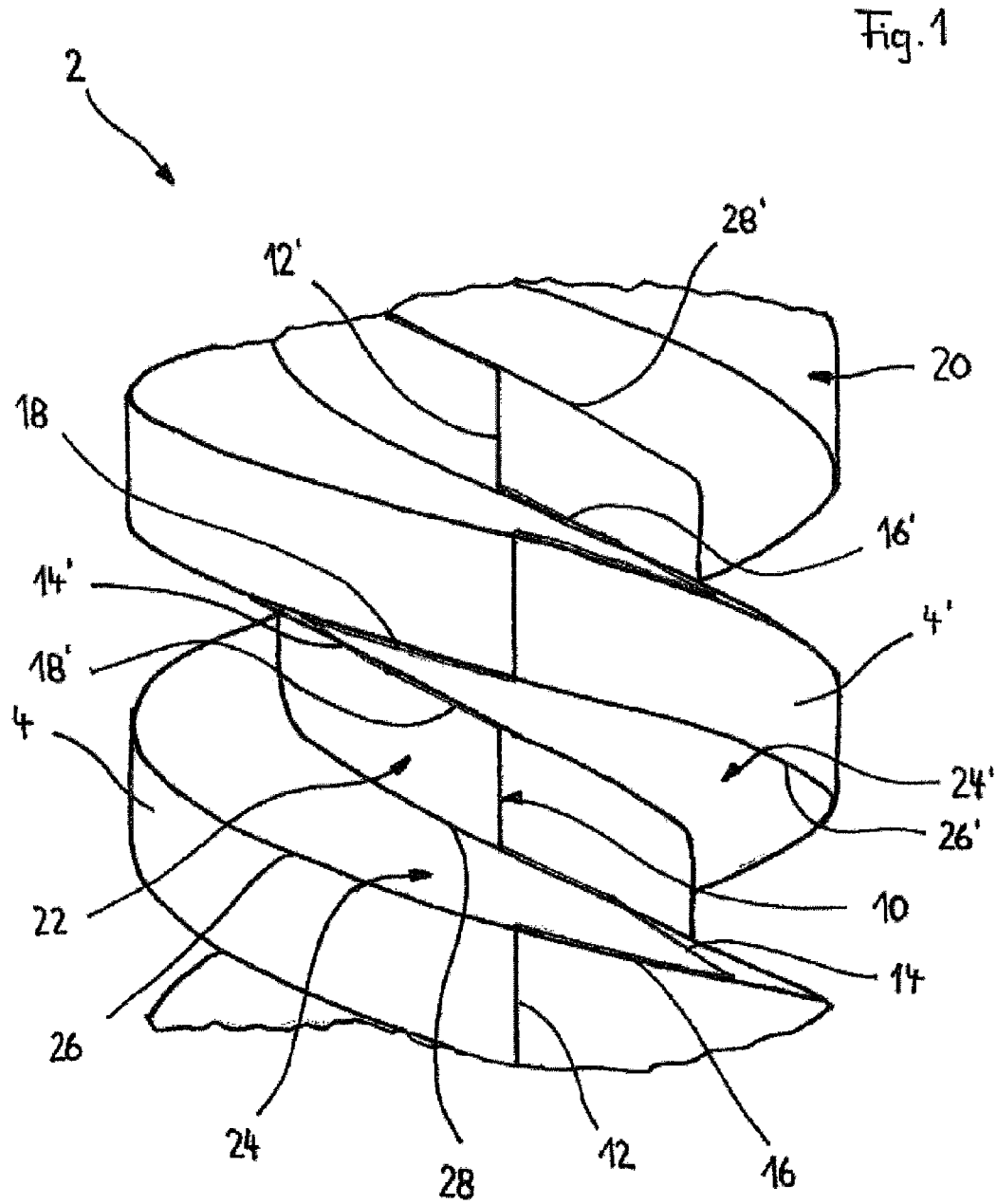
FIG. 1 shows a view of a main conveyor screw according to an embodiment of the invention.

FIG. 1 shows a perspective view of a main conveyor screw 2 according to an embodiment of the invention, which has two helical flights 4, 4' which are arranged in mutually displaced relationship. In this case, the main conveyor screw 2, also referred as the first conveyor screw, in operation of a conveyor path, which is shown in FIGS. 3 and 4, is in engagement with a subsidiary conveyor screw 6 (FIG. 2; not shown in FIG. 1 in order better to illustrate the invention) which has three flights 8, 8', 8". The first and second conveyor screws 2, 6 are preferably driven in mutually opposite relationship or rotate in opposite directions of rotation. Provided between the main conveyor screw 2 and the subsidiary conveyor screw 6, also referred to as the second conveyor screw, is a continuous or constant contact line 10 which extends substantially in the longitudinal direction of the two conveyor screw 2, 6. The surfaces of the first and second conveyor screws are in contact with each other along the continuous contact line preferably in areal relationship or with common tangential planes. The contact line 10 is composed of a plurality of line portions 12, 12', 14, 14', 16, 16', 18, 18' arranged in a row, wherein the line portions, in relation to the axis of rotation 19 of the main or subsidiary conveyor screw 2, 6, extend in the axial direction, are oriented in the radial direction, and extend in the tangential direction. The axially-extending line portions 12, 12' lie on a connecting plane extending through the axes of rotation 19 of the first and second conveyor screws 2, 6, wherein the axially-extending line portions 12, 12' are adapted to extend over surface regions of the outer peripheral surface 20 of the flights 4, 4' and a bottom 22 between the flights 4, 4'. The radially-oriented line portions 14, 14' extend over a surface region approximately transversely relative to the direction in which a flight flank 24, 24' extends, extending on the flights 4, 4' of the main conveyor screw 2. In that case, the substantially radially-oriented line portions 14, 14' are oriented alternately at both sides of the axially-extending line portions 12, 12'. The axially-extending line portions and the radially-oriented line portions are connected together by way of approximately tangentially-extending line portions 16, 16', 18, 18'. The tangentially-extending line portions extend region-wise at least parallel along a flight outside edge 26, 26' and along a flight inside edge 28, 28' which subdivide or delimit either the peripheral surface 20 or the bottom 22 of the flight flanks 24, 24'. The radially-extending line portions 14, 14' include an acute angle relative to each other with respect to the axis of rotation of the conveyor screw 2.

Figure 2:
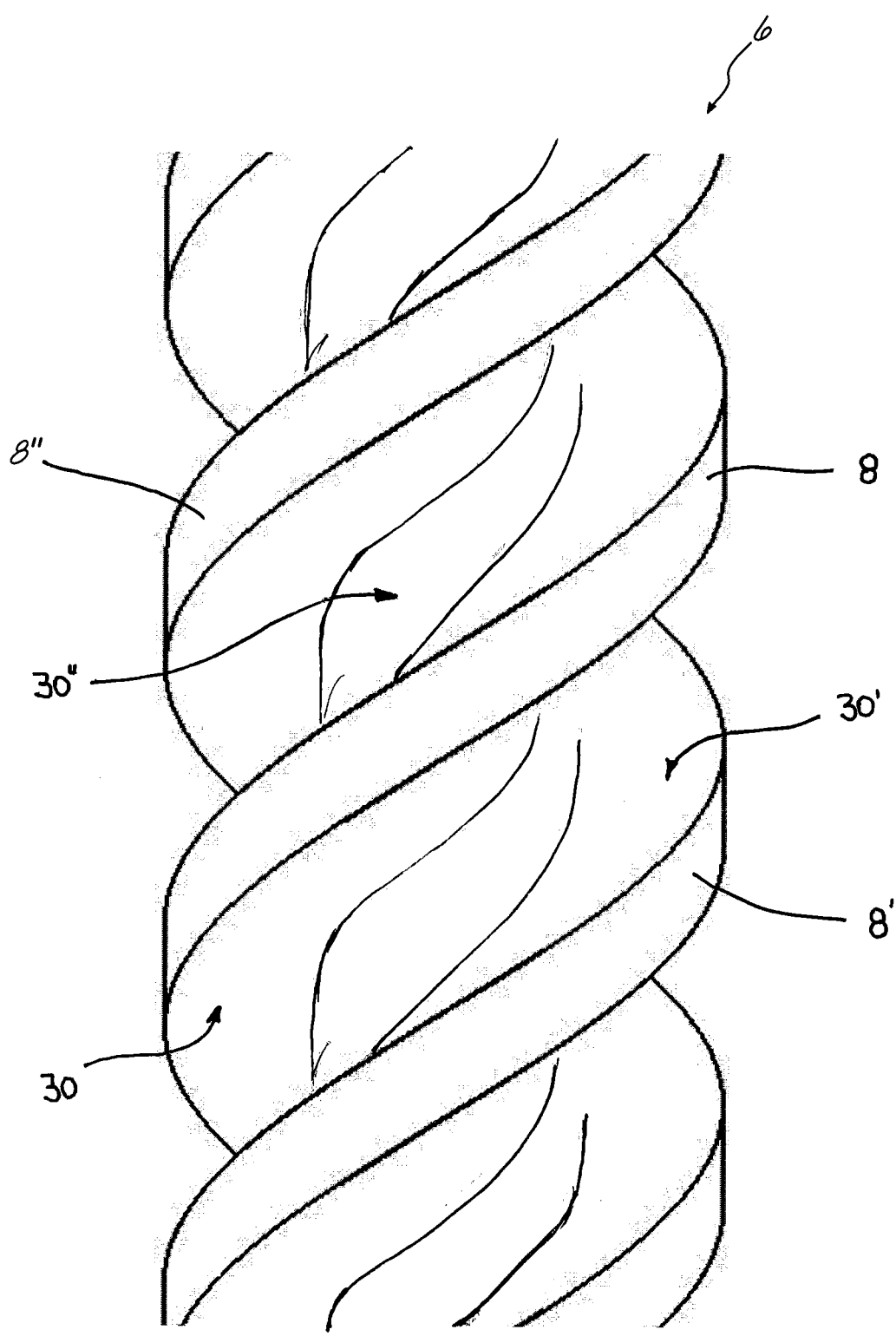
FIG. 2 shows a view of a subsidiary conveyor screw according to an embodiment of the invention.

FIG. 2 shows the subsidiary conveyor screw 6, also referred as the second conveyor screw, with its three flights 8, 8', 8", which is in contact with the main conveyor screw 2 (FIG. 1) substantially along a continuous contact line in the longitudinal directions thereof. In that respect, areal contact or contact with common tangential planes is preferably produced between the surfaces of the two conveyor screws 2, 6. In addition, a return flow of the conveyed material in opposite relationship to the conveying direction is hindered, preferably prevented. The flight flanks 30, 30' and the bottom 30" of the subsidiary conveyor screw or second conveyor screw 6 respectively have with respect to each other a preferably curved transition with a uniform or also changing radius of curvature. As can be clearly seen from the sectional view in FIG. 3, there are therefore no edge-shaped transitions between the flight flanks 30, 30' and the bottom 30" of the subsidiary conveyor screw 6, in contrast to the main conveyor screw 2. The contact line 10, which is shown on the surface of the main conveyor screw 2 in FIG. 1, is reproduced in the same size on the surface of the secondary conveyor screw 6, which however is not shown in detail for simplification purposes.

As can be seen from FIG. 3, the flight flanks 24, 24' of the main conveyor screw 2 have a convex curvature. In contrast, the flight flanks 30, 30' of the flights 8, 8', 8" of the subsidiary conveyor screw 6 have a concave curvature, which however along the contact line 10 ensures a sealingly closing conveyor screw or conveyor curve arrangement.

As can be seen from FIG. 4 showing the main and subsidiary conveyor screws 2, 6 in cross-section, the conveyor screw 2 preferably has two flights 4, 4' and the subsidiary conveyor screw 6 is equipped with three flights 8, 8', 8". The main conveyor screw 2 has a central segment 32 with side surfaces 34, 34' extending in a circular shape. Arranged on mutually opposite sides of the central segment 32 is a respective edge segment 36, 36' which represent sectional regions of the flights 4, 4' extending helically around the central segment and the outer peripheral surface 20 of the flights 4, 4' of the main conveyor screw 2. The subsidiary conveyor screw 6 arranged parallel thereto also has a central segment 38 with flight limbs 40, 40', 40" extending radially outwardly thereon. The flight limbs 40, 40', 40" also represent the sectional regions of the flights 8, 8', 8" extending helically around the central segment. The subsidiary conveyor screw 6 is of a smaller outside diameter in comparison with the main conveyor screw 2. As can also be seen from FIG. 3, the interengaging profiles always represent at least one contact point on each other, whereby it will be clear that, irrespective of the position of the first and second conveyor screws 2, 6 which are arranged rotatably relative to each other, a constant or continuous contact line is ensured in the longitudinal direction between the conveyor curves. Thus, even when high pressures are involved during a processing procedure in the conveyor path, this ensures that the material which is to be conveyed and possibly also mixed at the same time is not pushed back in opposite relationship to the actual conveying direction.

The invention claimed is:

1. An apparatus for processing a foodstuff, the apparatus comprising:
   first and second conveyor screws that are arranged to be rotatably movable relative to each other to process the foodstuff, the first and second conveyor screws including respective helical flights that are interengaged and drivable in opposite relative directions, and the first and second conveyor screws have different outside diameters, a different number of helical flights, or both,
   wherein the helical flights of the first and second conveyor screws each have an outer surface, the outer surfaces being respectively shaped and matched relative to each other, and the outer surfaces being in contact with each other along a substantially continuous contact line extending substantially in a longitudinal direction of the first and second conveyor screws so that a return flow of the foodstuff is hindered.

2. The apparatus of claim 1 wherein the number of helical flights for the first conveyor screw is two and the number of helical flights for the second conveyor screw is three.

3. The apparatus of claim 2 wherein the outside diameter of the second conveyor screw is less than the outside diameter of the first conveyor screw.

4. The apparatus of claim 1 wherein the outside diameter of the second conveyor screw is less than the outside diameter of the first conveyor screw.

5. The apparatus of claim 1 wherein the contact line is composed of a plurality of line portions arranged in a row, and the line portions extend relative to respective axes of rotation of the first and second conveyor screws alternately at least approximately in an axial direction and substantially in a radial direction.

6. The apparatus of claim 5 wherein the line portions of the contact line lie on a connecting plane defined by the axes of rotation of the first and second conveyor screws.

7. The apparatus of claim 5 wherein the line portions that extend in the axial direction are adapted to extend over surface regions of the outer surfaces of the helical flights and a bottom between adjacent pairs of the helical flights.

8. The apparatus of claim 5 wherein the line portions that extend in the radial direction are alternately displaced relative to both sides of the line portions that extend in the axial direction in such a way that the line portions that extend in the radial direction include an acute angle relative to each other with respect to the axes of rotation.

9. The apparatus of claim 5 wherein the line portions that extend in the radial direction extend over a surface region approximately transversely relative to the direction in which a flight flank extends.

10. The apparatus of claim 5 wherein the line portions that extend in the axial direction and the line portions that extend in the radial direction are respectively provided in a displaced relationship, and the line portions that extend in the axial direction are connected to each other by approximately tangentially-extending line portions of the contact line.

11. The apparatus of claim 10 wherein the tangentially-extending line portions extend region-wise at least parallel along an outside edge of each flight to subdivide the outer surface of each flight from a flight flank and along an inside edge of each flight flank that delimits a bottom between adjacent helical flights from the flight flank.

12. The apparatus of claim 1 wherein the helical flight of the first conveyor screw includes a plurality of flight flanks having a convex curvature with respect to a longitudinal section through the first conveyor screw.

13. The apparatus of claim 1 wherein the helical flight of the second conveyor screw includes a plurality of flight flanks having a concave curvature in a longitudinal section along a connecting plane extending in the longitudinal direction.

14. The apparatus of claim 1 comprising:
an inlet, an outlet, and a conveyor path extending between the inlet and the outlet; and
a conveyor device arranged in the conveyor path, the conveyor device configured to convey the foodstuff from the inlet toward the outlet.

15. The apparatus of claim 14 comprising:
a filling hopper configured to receive the foodstuff;
an extrusion head configured to produce a string of the foodstuff covered with a casing material; and
at least one dividing device for dividing the string into individual portions and a division location between adjacent portions.

16. The apparatus of claim 1 wherein the first and second conveyor screws have different outside diameters and a different number of helical flights.

* * * * *